INVENTOR.
Virgual T. Lindbloom

May 9, 1961 V. T. LINDBLOOM 2,983,452
ROTARY SPRAYER

Filed June 12, 1958 2 Sheets-Sheet 2

INVENTOR.
Virgual T. Lindbloom
BY
ATTORNEYS

United States Patent Office 2,983,452
Patented May 9, 1961

2,983,452
ROTARY SPRAYER
Virgual T. Lindbloom, 3325 Pierce St., Wheatridge, Colo.
Filed June 12, 1958, Ser. No. 741,551
3 Claims. (Cl. 239—259)

This invention relates to rotary sprayers, and more particularly to high pressure, high temperature rotary sprayers for sanitary installations using cleaning liquids which are relatively corrosive under such high pressures and high temperatures.

In the food processing industry, certain conditions require perishable products to be very quickly converted from a dirty, unsanitary condition to a relatively high sanitary condition in a minimum of time. The treatment must be substantially innocuous to the perishable products, and generally it is preferable to have a treatment completed in a minimum of time. This is especially true in a meat packing industry where animal carcasses after slaughter and dressing must be cleaned so that they may be temporarily stored during precuring. To prevent deterioration and spoilage during the curing, the carcasses must be thoroughly cleaned of dirt and bacteria. Common procedure includes washing the carcasses with a hot cleaning solution at a high pressure, and this treatment is sufficient to wash dirt and adhering matter from the meat. Meat is subject to damage under the high pressure streams of solution, and by providing a rotary sprayer the direct effect of the sprayer is reduced but the cleaning is effectively retained.

Included among hte objects and advantages of the present invention is an effective and highly durable rotary sprayer which is arranged for operation at high pressures and relatively high temperatures of relatively corrosive cleaning solutions. The sprayer of the invention is substantially leak-proof after long periods of use, and there is provided an effective seal for maintaining the rotary bearings substantially free from the liquid passing through the device. The device provides a double bearing arrangement to effectively carry thrust and lateral loads.

These and other objects and advantages of the invention may readily be ascertained by referring to the following description and appended drawings in which.

Figure 1:
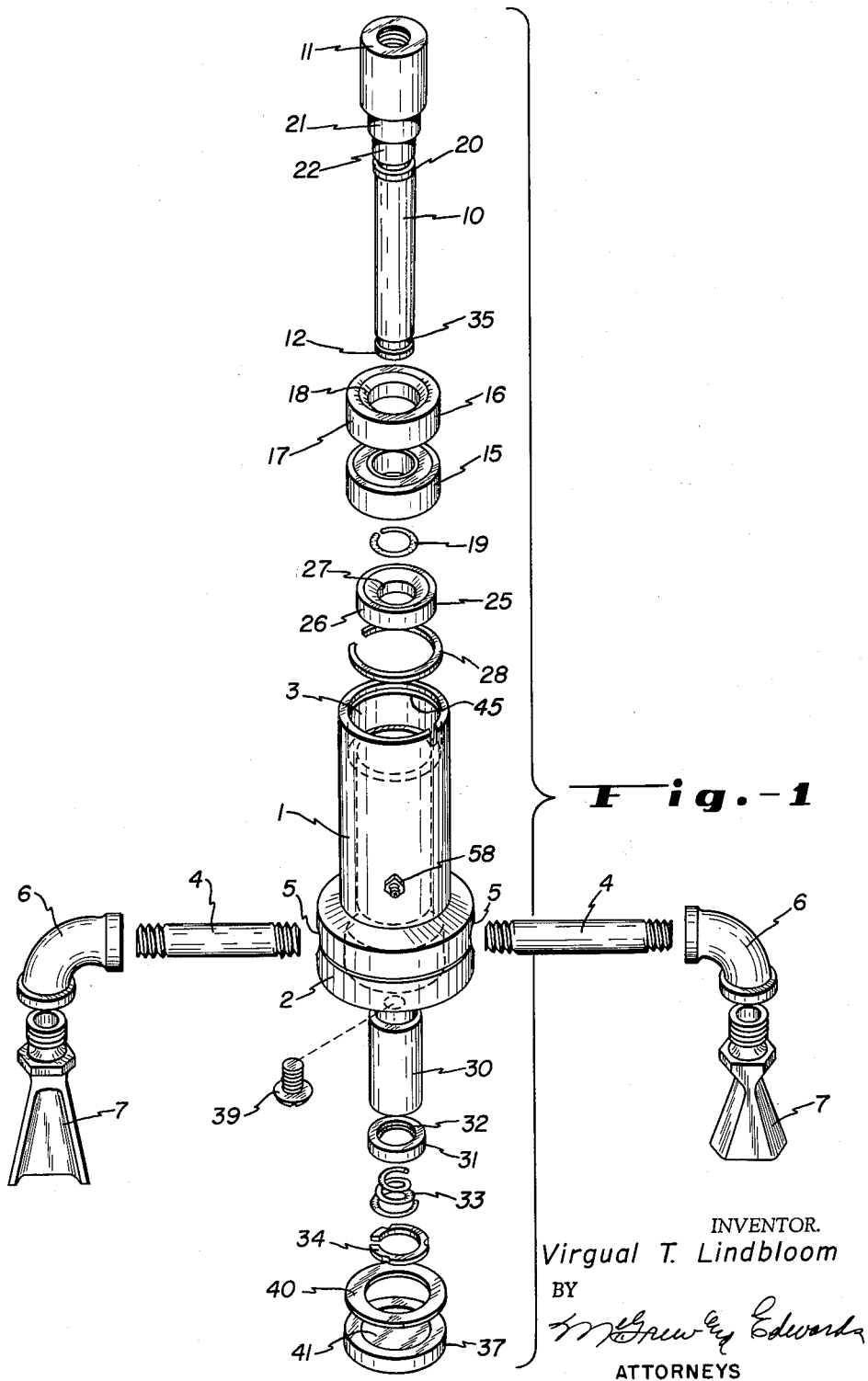
Fig. 1 is an exploded view of a sprayer according to the invention with the parts in relative position.
Figure 2:
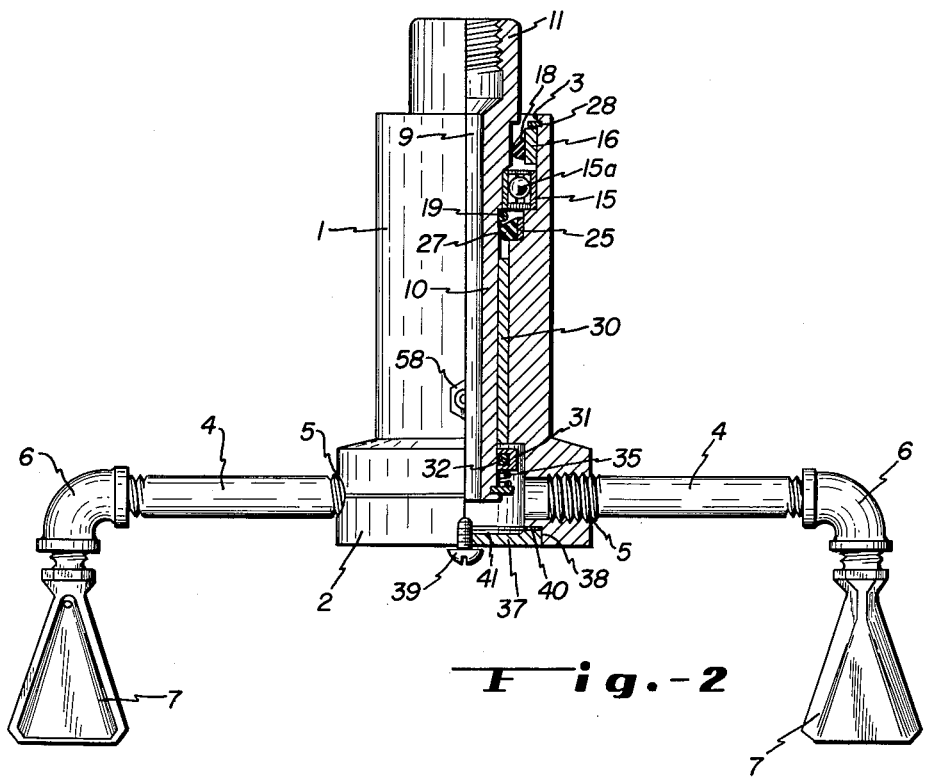
Fig. 2 is a partial sectional view of the sprayer according to the invention, illustrating the sprayer in assembled condition; and, Fig. 3 illustrates one method of use of the sprayer according to the invention.

The device illustrated includes a main, generally tubular body 1 having an enlarged head portion 2 and a passage 3 extending therethrough. A pair of nipples 4 are arranged to be threaded into threaded openings 5 in the head 2 on opposite sides of the body, and an ell 6 is arranged to be secured to the free end of each nipple. A spray head 7 is secured to each ell, and it is arranged for spraying a fan-shaped spray of liquid. The spray heads are shaped for providing impetus for rotational movement of the sprayer. A hollow shaft 10 arranged for telescoping with the body has a threaded connection 11 at one end for attachment to a liquid supply manifold or pipe, and an open end 12 which communicates with the cavity in the head when assembled therewith.

The body 1 is arranged to rotate on the shaft 10 which is rigidly mounted on the supply manifold through its connection 11. The rotation of the device is aided by means of ball bearing assembly 15 which securely seats on the shaft 10 and in the upper cavity 3 of the body. The ball bearings are of the enclosed type with the balls mounted in inner and outer races to provide substantially frictionless rotation and provide a thrust bearing to accommodate the large thrust forces produced by the high pressures. A seal 16 is arranged to seat between the enlarged head of the threaded portion 11 and the bearing 15 to seal the shaft and prevent leakage of liquid into the bearings. The seal includes an outer metallic member 17 and an inner neoprene seal 18 which snuggly fits the shaft 10 and permits rotation of the shaft. The bearing 15 and its seal 16 are maintained securely in place on the shaft in the assembly by means of a spring clamp 19 which fits into groove 20 in shaft 10. The seal 16 seats on shoulder 21 adjacent the head 11 while the bearing 15 seats on the shoulder 22 immediately there-below. Spring clamp 19 seated in groove 20 securely holds the seal 16 and bearing 15 on their respective seats on the shaft. The upper or opposite end of the ball bearing assembly 15 is sealed by means of a seal 25 which is similar to the seal 16, and it includes an outer metallic race 26 and an inner neoprene seal 27 which seats snuggly on the shaft 10 sealing it and still permits rotation of the shaft. With the bearings and the seals securely mounted on the shaft, a spring clamp 28 seats in a groove 45 securely holding the whole assembly in position in body 1. This subassembly is accomplished prior to inserting the shaft into the body.

A sleeve bearing 30 is press-fitted into the passage through the body 1, and provides for rotation of the body on the shaft 10 and provides a relatively tight rotary seal therebetween. The open end of the shaft when mounted in the head 2 is securely sealed therein by a fibre gasket 31 having a neoprene O ring seal 32 secured in an internal groove. The O ring 32 is a tight fit on the shaft 10 sealing the same, but permitting rotation while maintaining the seal. The fibre gasket 31 is retained in place securely against a shoulder in the head 2 by means of a spring 33. The spring is in turn retained on the shaft by means of a spring clamp 34 mounted in a groove 35 on the shaft 10. A cap 37 is mounted in a groove or rabbit 38 in the head 2 and is securely held therein by means of screw 39. A gasket 40 provides a seal for the cap 37 and prevents leakage of liquids. The cap 37 has a central cavity 41 which provides a larger space for liquid exhausting from the passage to the shaft 10 into the head 2.

In assembled position with the shaft mounted in the sleeve bearing 30 in the body 1, the seal 25 effectively prevents liquid from entering the cavity containing the ball bearing set 15 and the seal 16 prevents liquid from entering outside the body into the bearing cavity. Liquid entering passage 9 in the shaft 11 exhausts into the cavity and head 2, through the openings 5 into the nipples 40 and subsequently through the spray nozzles 7. All of the rotary parts are designed for tight fit, and when properly assembled the sprayer does not freely rotate on the shaft but is only turned with difficulty. For lubrication, a grease fitting 58 is mounted on the body communicating with opening of the sleeve bearing. For normal use a cleaning solution under 160 to 250 pound pressure is passed through the device at a temperature of 100° F. to 140° F. Under this high temperature and pressure, the sprayer freely turns at a high rate of speed spreading a fine spray under a substantial force. The speed of the sprayer is so high that it must be delicately balanced before entering actual operation; and for this purpose weights are braised on the ells 6 or other convenient parts. The body 1 is preferably made of aluminum, while the shaft is chromium plated for wear and corrosion resistance.

Figure 3:
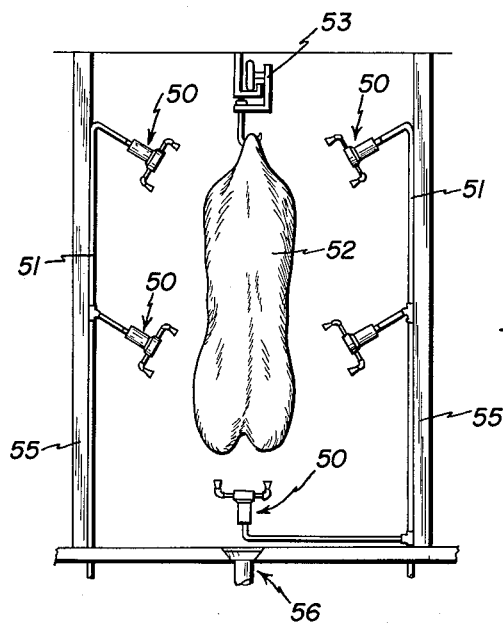

In a normal operation a series of spray heads may be mounted on a header, and are arranged to spray a beef carcass, for example as illustrated in Fig. 3. A plurality of such spray heads 50 are mounted on headers 51, and are arranged to spray all parts of a carcass 52 which is mounted on an overhead conveyor 53 passing the carcass through the sprayers. Walls 55 prevent undue spreading of the spray and a drain 56 exhausts the liquid. With such an arrangement the entire carcass is subjected to a high velocity, fine spray thoroughly cleaning the same.

Sprayers commonly used in the meat processing industry only last a few days under the extreme conditions of operation. A sprayer made according to the invention has lasted over ten weeks with no evidence of wear or corrosion on the critical rotary parts. Also, the parts when worn are easily replaced.

In the exploded view of Fig. 1, the ring clamp 28 is indicated below the seal 25. In the assembly view it is illustrated in position in the groove 45 in the body. Since it is a spring clamp in open position, its inside diameter is larger than the outside diameter of the seal 25, the bearing 15 and the seal 16 so it slips over the assembly and is easily placed into the groove at the outer end 3 of the body holding the seal 16 in position.

While the invention has been illustrated by reference to a specific device, it is obvious changes and modification may be made to suit particular systems without departing from the spirit and scope of the invention. Thus a double ball bearing set may be used where very heavy lateral and thrust loads are encountered. Also, any equivalent seal may replace the neoprene seals, where such seals are capable of withstanding the rotational wear and the heat and pressure, and still maintain the bearing sets substantially liquid free.

I claim:

1. A high speed rotary sprayer for relatively high pressure and temperature corrosive liquids, comprising in combination, a tubular shaft having a plurality of external stepped shoulders adjacent one end, said end arranged for substantially rigid and non-rotatable mounting on a liquid supply conduit, an external circumferential groove adjacent the other end of said shaft, a tubular body of relatively thick wall construction having a plurality of internal stepped shoulders, said tubular body encompassing a substantial portion of said shaft and arranged for rotation thereon, an elongated sleeve bearing of substantially the same length as said tubular body mounted in the bore of said tubular body and rotatable on said shaft, at least one thrust bearing supported between adjacent stepped shoulders of said shaft and tubular member above said sleeve bearing and arranged to carry thrust and lateral loads, a flexible seal on each side of said thrust bearing arranged to maintain said thrust bearing substantially liquid free, one of said seals mounted between other adjacent stepped shoulders of said shaft and tubular member, a third flexible seal mounted on said shaft at the other end of said sleeve bearing above said groove, means engaging said groove in said shaft arranged to support spring means thereby to maintain said third seal in close liquid sealing contact with said sleeve bearing, said thrust bearing in combination with the stepped shoulders in contact therewith and the means retained in the groove being the sole means of holding the shaft and tubular member together, means including opposed conduit means and spray heads carried thereby connected to said body for releasing liquid passing through said tubular shaft and providing impetus for rotation of said body and spray heads, and a cover on the free end of said tubular body enclosing the same in fluid tight relation.

2. A high speed rotary sprayer for relatively high pressure and temperature corrosive liquids, comprising in combination, a tubular shaft having a plurality of external stepped shoulders adjacent one end, said end arranged for substantially rigid mounting on a liquid supply conduit, an external circumferential groove adjacent the other end of said shaft, a tubular body of relatively thick wall construction and of substantially the same length as said shaft having a plurality of internal stepped shoulders, said tubular body encompassing a substantial portion of said shaft and arranged for rotation thereon, an elongated sleeve bearing of substantially the same length as said tubular body mounted in the bore of said tubular body and rotatable on said shaft, at least one thrust bearing supported between adjacent stepped shoulders of said shaft and tubular member above said sleeve bearing and arranged to carry thrust and lateral loads, a flexible seal on each side of said thrust bearing arranged to maintain said thrust bearing substantially liquid free, one of said seals mounted between other adjacent stepped shoulders of said shaft and tubular member, a third flexible seal mounted on said shaft at the other end of said sleeve bearing above the groove in said shaft, a spring clip engaging said groove in said shaft and arranged to support spring means, said spring means maintained against said third seal holding it in close liquid sealing contact with said sleeve bearing, said thrust bearing in combination with the stepped shoulders in contact therewith and the spring clip retained in the groove being the sole means of holding the shaft and tubular member together, means including opposed conduit means and spray heads carried thereby connected to said body for releasing liquid passing through said tubular shaft and provide impetus for rotation of said body and spray heads and a cover on the free end of said tubular body enclosing the same in fluid tight relation.

3. A high speed rotary sprayer for relatively high pressure and temperature corrosive liquids, comprising in combination, a tubular shaft having a plurality of external stepped shoulders adjacent one end, said end arranged for substantially rigid mounting on a liquid supply conduit, an external circumferential groove adjacent the other end of said shaft, a tubular body of relatively thick wall construction and of substantially the same length as said shaft having a plurality of internal stepped shoulders, said tubular body encompassing a substantial portion of said shaft and arranged for rotation thereon, an elongated sleeve bearing of substantially the same length as said tubular body mounted in the bore of said tubular body and rotatable on said shaft, at least one thrust bearing supported between adjacent stepped shoulders of said shaft and tubular member above said sleeve bearing and arranged to carry thrust and lateral loads, a flexible seal on each side of said thrust bearing arranged to maintain said thrust bearing substantially liquid free, one of said seals mounted between other adjacent stepped shoulders of said shaft and tubular member, a third flexible seal mounted on said shaft at the other end of said sleeve bearing above the groove in said shaft, a spring clip engaging said groove in said shaft and arranged to support spring means, said spring means maintained against said third seal holding it in close liquid sealing contact with said sleeve bearing, said thrust bearing in combination with the stepped shoulders in contact therewith and the spring clip retained in the groove being the sole means of holding the shaft and tubular member together, means including opposed conduit means and spray heads carried thereby connected to said body for releasing liquid passing through said tubular shaft and provide impetus for rotation of said body and spray heads, said conduit means and spray heads carried thereby being weighted to substantially balance them at high speeds, and a cover on the free end of said tubular body enclosing the same in fluid tight relation.

References Cited in the file of this patent
UNITED STATES PATENTS

| | | |
|---|---|---|
| 1,723,014 | Dahllof | Aug. 6, 1929 |
| 1,845,364 | Thompson | Feb. 16, 1932 |
| 1,875,780 | Thompson | Sept. 6, 1932 |
| 1,876,250 | Lassen et al. | Sept. 6, 1932 |
| 2,053,783 | Ruesenberg | Sept. 8, 1936 |
| 2,108,787 | Coles et al. | Feb. 22, 1938 |
| 2,501,680 | King | Mar. 28, 1950 |
| 2,518,216 | Barker | Aug. 8, 1950 |
| 2,602,003 | Wellborn | July 1, 1952 |